(12) United States Patent
Tweedie

(10) Patent No.: US 8,234,791 B2
(45) Date of Patent: Aug. 7, 2012

(54) STRUCTURAL STUD FINDER DEVICE AND METHOD

(76) Inventor: Richard Tweedie, Santa Rosa, CA (US)

( * ) Notice: Subject to any disclaimer, the term of this patent is extended or adjusted under 35 U.S.C. 154(b) by 606 days.

(21) Appl. No.: 12/511,212

(22) Filed: Jul. 29, 2009

(65) Prior Publication Data

US 2011/0025293 A1    Feb. 3, 2011

(51) Int. Cl.
*G01B 3/00* (2006.01)
*G01R 19/00* (2006.01)

(52) U.S. Cl. ............ 33/542; 33/544.1; 324/67; 324/326

(58) Field of Classification Search .................... 33/542, 33/544.1, 544.2, 555.1, 555.2, 555.4; 324/67, 324/326, 328
See application file for complete search history.

(56) References Cited

U.S. PATENT DOCUMENTS

| | | | | |
|---|---|---|---|---|
| 2,933,679 A | * | 4/1960 | Bray | 33/355 R |
| 2,992,488 A | * | 7/1961 | Berrett | 33/542 |
| 3,845,384 A | * | 10/1974 | Stoutenberg et al. | 324/228 |
| 2006/0021243 A1 | * | 2/2006 | Spanski et al. | 33/760 |
| 2007/0234483 A1 | * | 10/2007 | Kunz et al. | 33/342 |
| 2008/0047156 A1 | * | 2/2008 | Lee | 33/542 |
| 2011/0025293 A1 | * | 2/2011 | Tweedie | 324/67 |

\* cited by examiner

*Primary Examiner* — Yaritza Guadalupe-McCall
(74) *Attorney, Agent, or Firm* — Bay Area Technology Law Group PC

(57) ABSTRACT

A device for locating structural stud members beneath a surface such as a shingled roof. The device includes a support block for receiving a probe member, the probe member extending from the support block at a selected arc of curvature terminating at a point spaced apart from the support block. An indicator member is fixed to the support block, the indicator member extending from the support block parallel to the probe member and having an end coextensive with the termination point of the probe member such that the indicator member provides a user with the orientation and termination point of the probe member when the probe member is beneath the surface. In use, a hole created within the surface and the support block rotated on the surface until the probe member abuts an edge of a structural stud member.

16 Claims, 2 Drawing Sheets

STRUCTURAL STUD FINDER DEVICE AND METHOD

TECHNICAL FIELD

The present invention involves a device for locating structural stud members. This device offers a degree of practical utility unachievable by present stud finders which rely upon electronic means to determine the location of studs as a result of the density differences that they create. However, when thick and uneven surfaces, such as shingled roofs, are confronted, finding structural stud members beneath them is an almost impossible task.

BACKGROUND OF THE INVENTION

Both commercially and domestically, it is oftentimes desirable if not absolutely necessary to be able to locate studs beneath sheet rocked walls or as structural support members for roofs and the like. For even the simple task of hanging a picture or installing a new set of shelves, the finding of a structural stud member behind a surface can be important if not critical.

Before there were stud finders, one would either pound a small nail into the wall until it hit a stud or a small pivoting magnet would be used whose orientation would change when a magnetizable object such as a nail was confronted.

Electronic stud finders replaced the hit and miss and pivotable magnet approaches. These products operate like a touch switch on a touch-sensitive lamp. They use changes in capacitance to sense stud location. When the plate inside the stud finder is over a surface such as wallboard, it will sense one dielectric constant but when over a stud, the dielectric constant is different. It works on a capacitance differential generated by density differences. The circuit in the stud finder can sense changes and report it on its display. The magnet approach was made the subject of U.S. Pat. No. 3,845,384 issued in 1974. The stud finder based upon detection of capacitive differences was made the subject of U.S. Pat. No. 4,099,118 issued in 1978.

Although current commercially available stud finders operate reasonably well in the right conditions, there are many instances where the detection of capacitive differences behind a wall or membrane can be difficult if not impossible For example, in applying the hardware necessary to support photovoltaic panels on a roof, it is oftentimes necessary to locate structural stud members for applying standoffs which in turn support rail members and solar photovoltaic panels thereon. Installations of this type have been disclosed in applicant's previously filed U.S. application Ser. No. 12/407,952, the disclosure of which is incorporated by reference herein. However, roofs oftentimes support one or more layers of composite shingles and similar waterproof membranes which provide surfaces which are too thick and uneven to enable capacitive-based stud finders to function.

It is thus an object of the present invention to provide a new paradigm in stud finder technology which does not depend upon capacitive differences to enable a user to locate a structural stud member beneath a surface.

It is yet a further object of the present invention to provide a novel stud finder device which can be used in virtually any environment whether or not the studs to be located are sufficiently proximate a homogeneous surface to enable them to be detected by capacitive techniques.

These and further objects will be more readily apparent when considering the following disclosure and appended claims.

SUMMARY OF THE INVENTION

In a first embodiment, the present invention involves a device for locating structural stud members beneath the surface, said device comprising a support block for receiving a probe member, said probe member extending from said support block at a selected are of curvature terminating at a point spaced apart from said support block, an indicator member fixed to said support block, said indicator member extending from said support block parallel to said probe member and having an end coextensive with said termination point of said probe member such that said indicator member provides a user with the orientation and termination point of said probe member when said probe member is beneath said surface.

As a second embodiment the present invention involves a device for locating structural stud members beneath a surface, said device comprising a support block fixedly retaining a tube extending therefrom in a first orientation, a first segment slidably passing within said tube and being spring biased to said support block, a second segment having a length and terminal end selectively oriented within said shaft, said second segment pivotable from a first orientation along a longitudinal axis established by the first segment to a second orientation substantially perpendicular to said longitudinal axis, an indicator member extending from said support block parallel to said second segment when in its second orientation and having an end coextensive with said terminal end of said second segment.

As a third embodiment, the invention is directed to a device for locating a structural stud member beneath a surface comprising a first segment which in use extends substantially perpendicularly to said surface, a second segment appended to said first segment having an arc of curvature and termination point and a third segment appended to said first segment extending substantially perpendicularly to said first segment in a direction substantially parallel to said second segment and having an end coextensive with said termination point of said second segment such that said third segment provides a user with the orientation and termination point of said second segment when said second segment is beneath said surface.

The devices described above can be used to carry out a method for locating a structural stud member beneath a surface, said method comprising drilling a hole through said surface, for application by one of the devices described above. For example, a support block is provided for receiving a probe member, said probe member extending from said support block at a selective arc of curvature terminating at a point spaced apart from said support block, an indicator member fixed to said support block, said indicator member extending from said support block parallel to said probe member and having an end coextensive with said termination point of said probe member such that said indicator member provides a user with the orientation and termination point of said probe member when said probe member is beneath said surface, feeding said probe member through said hole, rotating said support block until said probe member contacts an edge of said structural stud member the edge of said structural stud member being located beneath the end of said indicator member.

DETAILED DESCRIPTION OF THE INVENTION

Figure 1:
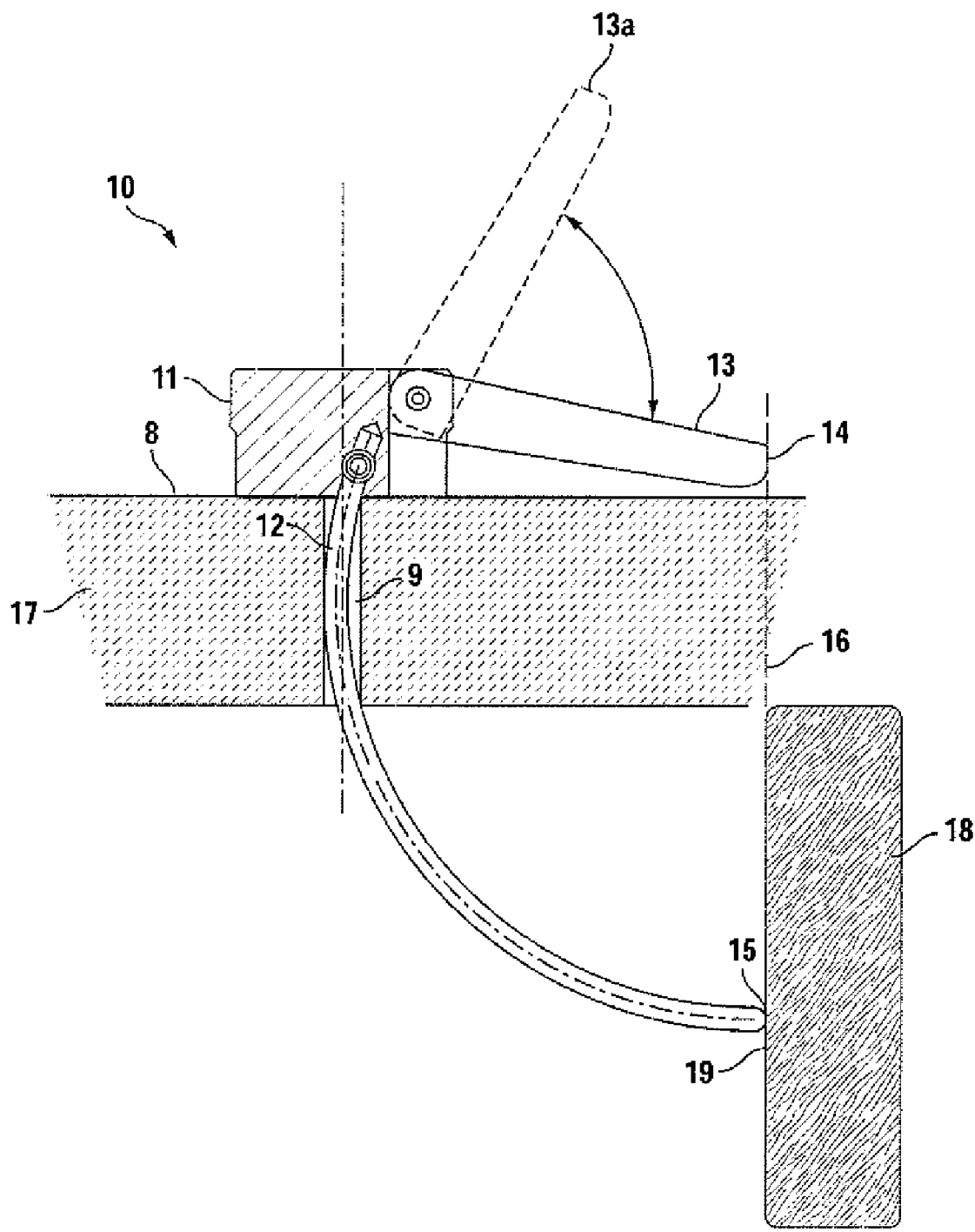
FIG. 1 is a side partial cross-sectional view of a first embodiment of the present invention

As noted previously, the present device has been configured for locating structural stud members beneath a surface FIG. 1 illustrates a first embodiment of the inventive device.

Turning to FIG. 1, device 10 has been employed to locate structural stud member 18 beneath membrane 17 having surface 8. As noted, oftentimes, finding the location of stud 18 can be extremely difficult, particularly when membrane 17 is thick or surface 8 uneven.

In operation, one would initially create through bore 9 generally of a smaller diameter than the diameter of any opening which would be made within membrane 17 above structural stud member 18 The location of through bore 9 could be randomly chosen or a skilled contractor could tap surface 8 of membrane 17 for determining the approximate location of stud 18.

Device 10, itself, comprises support block 11 for receiving probe member 12. In the embodiment shown in FIG. 1, probe member 12 is a wire, such as a stainless steel wire of approximately 1 inches in diameter having a radius of curvature of approximately 2 inches although both the size of probe member 12 and its radius of curvature can be widely varied depending upon the application to which device 10 will be put. As noted, probe member 12 extends from support block 11 at a selective arc of curvature terminating at 15 spaced apart from support block 11. Indicator member 13 extends from support block 11 and in, its preferred embodiment, is pivotal as noted by reference to phantom indicator member 13a. This feature allows the smallest possible through bore 9 consistent with reliable resealing, the ability to tip the indicator member up enables you to feed probe member 12 easily into bore 9. As further noted from FIG. 1, indicator member 13 extends from support block 11 parallel to probe member 12 terminating at 14. It should further be noted that probe termination point 15 is coextensive with indicator member terminal end 14, this relationship being highlighted by the inclusion of dotted line 16.

In operation, a user would first determine an approximate location for the creation of through bore 9. With indicator 13 pivoted upward, probe member 12 would then be fed within through bore 9 until support block 11 rests on surface 8 whereupon a user would lower indicator 13 and rotate support block 11 until probe end 15 is felt to confront an obstruction Probe member 12 would then be fed within through bore 9 whereupon a user would rotate support block 11 on surface 8 until probe end 15 confront an obstruction and could be turned no further. Terminal end 15 of probe 12 would then be in abutting contact with surface 19 of structural stud member 18 If indicator member 14 was in position 13a which may be preferred if surface 8 was uneven thus causing indicator member 13 to hang up on various obstructing surface characteristics, the indicator member would be lowered to its orientation shown at 13 such that terminal end 14 of indicator 13 would be directly above terminal end 15 of probe 12 A user could then measure in from terminal end 14 to locate the center of the stud for applying any anchoring hardware thereto.

It should be quite obvious in considering the above discussion that through the use of a simple through hole 9 within membrane 17 one is able to determine the location of stud 18 without use of any magnetic or capacitive instruments. No longer need one concern oneself with the nature of membrane 17 or surface 8 as an impediment to structural stud member location.

The device of FIG. 1 can also be made of a one piece construction for cost savings as well as for use by residential do-it-yourself handymen. In this regard, reference is made to FIG. 3

Figure 3:
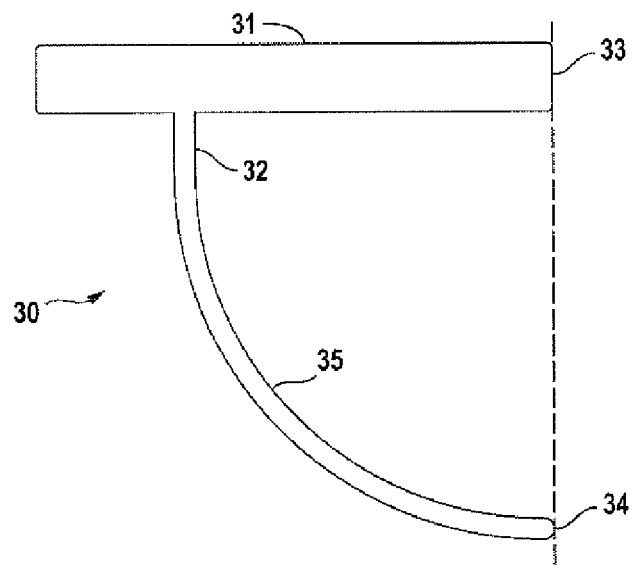

As noted in FIG. 3, device 30 can be composed of three merged segments, the first segment 32 which, in use, extends substantially perpendicularly to a surface to be probed, a second segment 35 having an arc of curvature and termination point 34 and a third segment 31 appended to said first segment extending substantially perpendicular to first segment 32 in a direction substantially parallel to second segment 35 and having end 33 coextensive with termination point 34 of second segment 35 such that third segment 31 provides a user with the orientation and termination point of second segment 35 when second segment 35 is beneath a surface. In operation, the embodiment of FIG. 3 would be used as was discussed with regard to FIG. 1 whereby second segment 35 would be fed through an appropriate through bore and rotated by grasping onto third segment 31 thus turning the device until terminal end 34 of second segment 35 abutted a face of a structural stud member.

It should be noted that in referencing FIG. 3, three segments were discussed as individual members. It should be quite apparent to even a casual observer that first segment 32 and second segment 35 could actually be one continuous member taking on the shape of curved wire 12 of FIG. 11n viewing the embodiment of FIG. 3 in that way, the continuous probe as the combined regions 32 and 35 would extend from portion 31 of device 30

Figure 2:
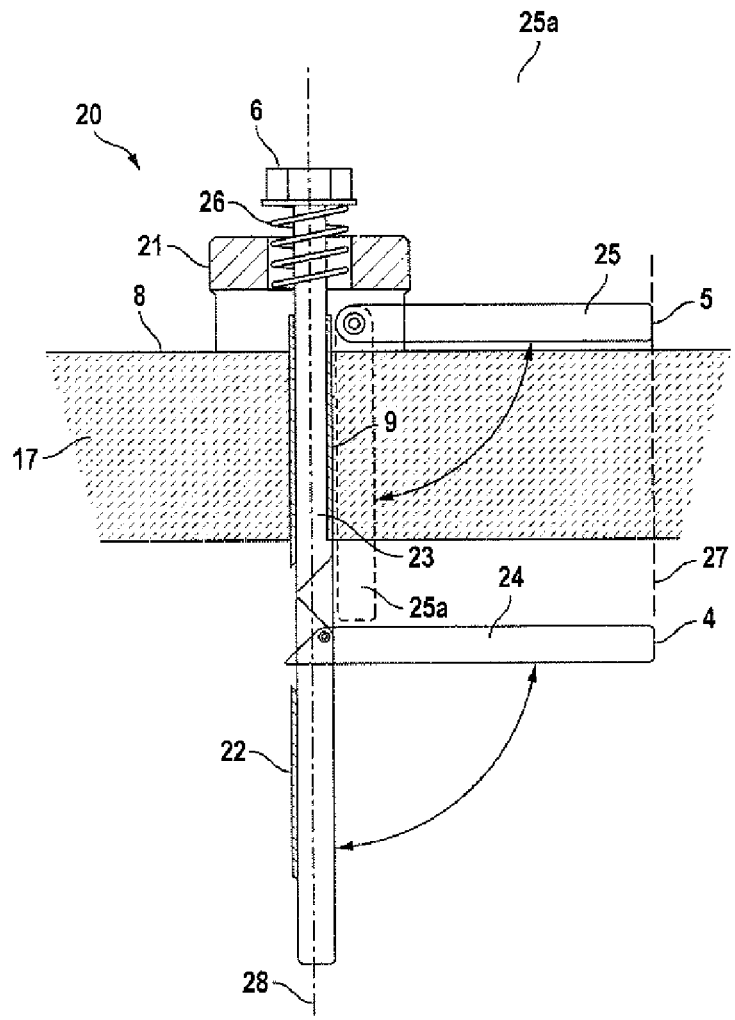
FIG. 2 is a side partial cross-sectional view of a second embodiment of the present invention FIG. 3 side partial cross-sectional view of a third embodiment of the present invention

FIG. 2 represents yet another embodiment of the present invention. Although this device is certainly more complex than its counterparts illustrated in FIGS. 1 and 3, it is certainly capable of locating appropriate structural stud members as discussed previously.

Turning to FIG. 2, device 20 is shown extending through membrane 17 supported by surface 8. The device itself comprises support block 21 affixedly retaining tube 22 extending therefrom in a first orientation along longitudinal axis 28. A first segment 23 housed within tube 22 is spring biased to support block 21 via helical spring 26. Second segment 24 is selectively oriented within tube 22, said second segment pivotable from first orientation along longitudinal axis 28 to its second orientation shown in FIG. 2 to be substantially perpendicular to longitudinal axis 28. Indicator member 25 which stores conveniently in location 25a, pivots upward to proximate surface 8 extending parallel to second segment 24 having terminal end 5 coextensive with terminal end 4 of second segment 24 as highlighted by the inclusion of dotted line 27.

In use, through bore 9 would first be created within membrane 17. With indicator member 25 raised, tube 22 would be inserted within through bore 9 noting that first segment 23 and second segment 24 would both be oriented along longitudinal axis 28. A user would then press down upon cap nut 6 depressing helical spring 26 and causing first segment 23 to press against second segment 24 causing the latter to extend horizontally as shown. Support block 21 would then be rotated until terminal end 4 of second segment 24 abutted a surface of the located structural stud member. Terminal end 5 of indicator 25 would then accurately inform a user of the location of an edge of the structural stud member.

The advantages in using the present invention should be quite apparent even to a casual observer. Various iterations of the present invention can be produced inexpensively providing devices which can be employed repeatedly as they have few, if any, moving parts and do not require the use of magnets or power sources to detect capacitive differences. A contractor or homeowner need only place one such device in one's tool kit for use virtually forever as there is nothing in these devices which should deteriorate requiring placement over time.

What is claimed is:

1. A device for locating structural stud members beneath a surface, said device comprising a support block for receiving a probe member, said probe member extending from said support block at a selected arc of curvature having a termination point spaced apart from said support block, an indicator member fixed to said support block, said indicator member extending from said support block parallel to said probe member and having an end coextensive with said termination point of said probe member such that said indicator member provides a user with the orientation and termination point of said probe member when said probe member is beneath said surface.

2. The device of claim 1 wherein said indicator member is pivotable with respect to said support block.

3. The device of claim 1 wherein said probe member comprises a wire.

4. The device of claim 1 wherein said support block is sized to be rotatable on said surface causing said probe member to rotate beneath said surface and said indicator member to rotate above said surface.

5. A device for locating a structural stud member beneath a surface comprising a first segment which in use extends substantially perpendicularly to said surface, a second segment appended to said first segment having an arc of curvature and termination point and a third segment appended to said first segment extending substantially perpendicularly to said first segment in a direction substantially parallel to said second segment and having an end coextensive with said termination point of said second segment such that said third segment provides a user with the orientation and termination point of said second segment when said second segment is beneath said surface.

6. The device of claim 5 wherein said first, second and third segments are of a single piece.

7. The device of claim 5 wherein said device is rotatable on said surface causing said second segment to rotate beneath said surface and said third segment to rotate above said surface.

8. A method for locating a structural stud member beneath a surface, said method comprising drilling a hole through said surface, providing a device, said device comprising a support block for receiving a probe member, said probe member extending from said support block at a selective arc of curvature and having a termination point spaced apart from said support block, an indicator member fixed to said support block, said indicator member extending from said support block parallel to said probe member and having an end coextensive with said termination point of said probe member such that said indicator member provides a user with the orientation and termination point of said probe member when said probe member is beneath said surface, feeding said probe member through said hole, rotating said support block until said probe member contacts an edge of said structural stud member the edge of said structural stud member being located beneath the end of said indicator member.

9. The method of claim 8 wherein said indicator member assumes a first orientation when said support block is rotated and assumes a second orientation when said probe member contacts said edge of said structural stud member.

10. The method of claim 9 wherein said indicator member is substantially parallel to said surface when in said second orientation.

11. A method for locating a structural stud member beneath the surface, said method comprising drilling a hole through said surface, providing a device, said device comprising a first segment which in use extends substantially perpendicularly to said surface, a second segment appended to said first segment having an arc of curvature and termination point and a third segment appended to said first segment extending substantially perpendicularly to said first segment in a direction substantially parallel to said second segment and having an end coextensive with said termination point of said second segment such that said third segment provides a user with the orientation and termination point of said second segment when said second segment is beneath said surface, feeding said second segment through said hole, rotating said device until said second segment contacts the edge of said structural stud member, said edge of said structural stud member being located beneath the end of said third segment.

12. A method of securing a stand off to a roof, said standoff having a threaded member for application to structural stud members supporting said roof, said method comprising drilling a first hole through said roof, applying a structural stud finder device to said roof, said structural stud finder comprising a support block for receiving a probe member, said probe member extending from said support block at a selective arc of curvature and having a termination point spaced apart from said support block, an indicator member fixed to said support block, said indicator member extending from said support block parallel to said probe member and having an end coextensive with said termination point of said probe member such that said indicator member provides a user with the orientation and termination point of said probe member when said probe member is beneath said device, feeding said probe member through said hole, rotating said support block until said probe member contacts an edge of said structural stud member, drilling a second hole a measured distance from the end of said indicator member to position said second hole within said structural stud member and securing said standoff through said second hole and into said structural stud member.

13. A device for locating structural stud members beneath the surface, said device comprising a support block fixedly retaining a tube extending therefrom in a first orientation, a first segment slidably passing within said tube and being spring biased to said support block, a second segment having a length and terminal end selectively oriented within said tube, said second segment pivotable from a first orientation along a longitudinal axis established by said first segment to a second orientation substantially perpendicular to said longitudinal axis, an indicator member extending from said support block parallel to said second segment when in its second orientation and having an end coextensive with said terminal end of said second segment.

14. The device of claim 13 wherein said indicator member is pivotable with respect to said support block.

15. The device of claim 13 wherein said support block is sized to be rotatable on said surface causing said second segment when in its second orientation to rotate beneath said surface and said indicator member to rotate above said surface.

16. A method for locating a structural stud member beneath the surface, said method comprising drilling a hole through said surface, providing a device, said device comprising a support block fixedly retaining a tube extending therefrom in a first orientation, a first segment slidably passing within said tube and being spring biased to said support block, a second segment having a length and terminal end selectively oriented within said tube, said second segment pivotable from a first orientation along a longitudinal axis established by said first segment to a second orientation substantially perpendicular to said longitudinal axis, an indicator member extending from said support block parallel to said second segment when in its second orientation having an end coextensive with said terminal end of said second segment, feeding said tube through said hole, compressing said spring to change said second segment from its first to second orientation, rotating said support block until said second segment contacts an edge of said structural stud member, the edge of said structural stud member being located beneath the end of said indicator member.

* * * * *